(No Model.) 2 Sheets—Sheet 1.
I. L. SHERMAN.
HAY CARRYING APPARATUS.
No. 350,273. Patented Oct. 5, 1886.
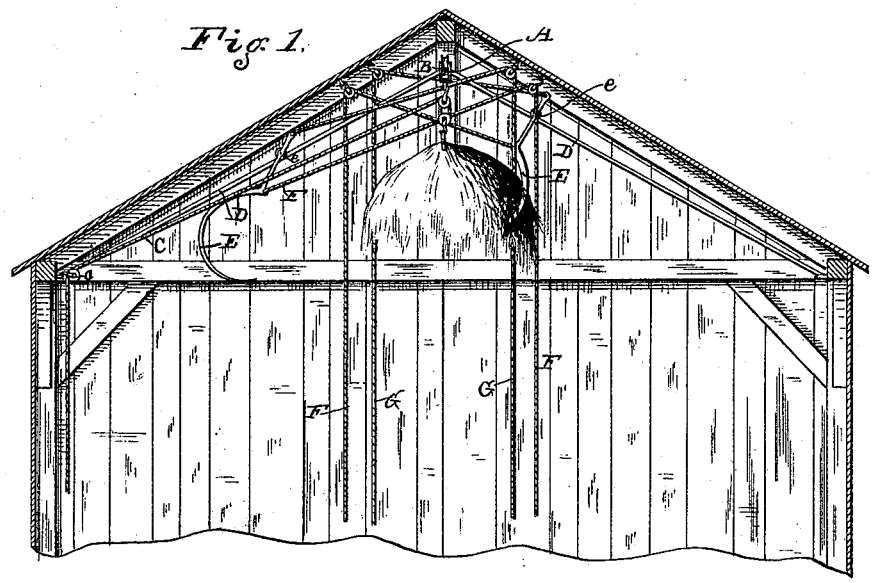
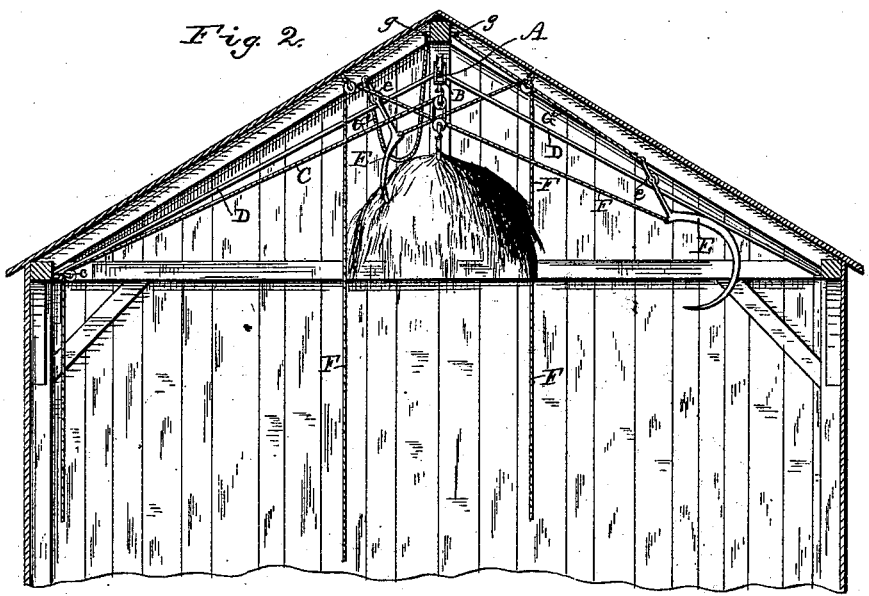
Witnesses:
C. E. Doyle
C. L. Taylor
Inventor:
Ira L. Sherman

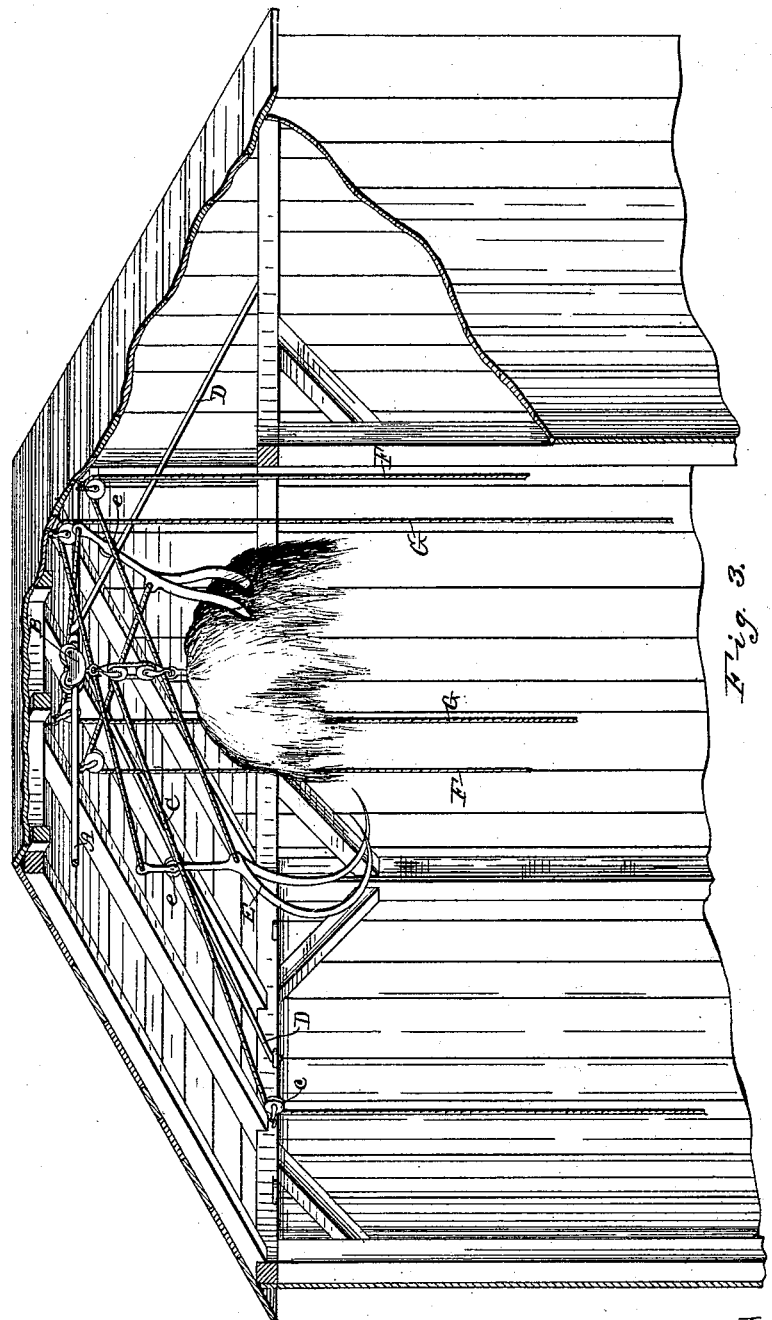

UNITED STATES PATENT OFFICE.

IRA L. SHERMAN, OF CATTARAUGUS, NEW YORK.

HAY-CARRYING APPARATUS.

SPECIFICATION forming part of Letters Patent No. 350,273, dated October 5, 1886.

Application filed January 26, 1886. Serial No. 189,835. (No model.)

*To all whom it may concern:*

Be it known that I, IRA L. SHERMAN, a citizen of the United States, residing at Cattaraugus, in the county of Cattaraugus and State of New York, have invented certain new and useful Improvements in Hay-Carrying Apparatus, of which the following is a specification, reference being had therein to the accompanying drawings.

The object of my invention is to provide a hay-carrying apparatus of such construction that the hay, after being lifted and moved along on the track extending lengthwise of the barn or hay-mow to the desired point, may be taken by carriers running on tracks extending laterally from the main track, thus enabling the hay to be deposited by the carrying apparatus in any part of the mow.

By the use of my invention the labor of storing away hay, straw, or unthrashed grain in barns is very considerably lessened, and damage to the hay, sometimes resulting from depositing at one time large quantities thereof which is not thoroughly cured along the main track of the carriers, may be avoided.

In the accompanying drawings, Figure 1 is a partial transverse view of a barn with my hay-carrying apparatus in position, and Fig. 2 is a similar view of a slightly-modified form of apparatus. Fig. 3 is a perspective view showing the form of apparatus illustrated in Fig. 1.

A denotes the ordinary or main track of a hay-carrying apparatus, extending lengthwise of the barn or hay-mow, and B is a carrier adapted to run on said track. Ordinary elevating hooks or forks are attached to a rope, C, running over a pulley in the carrier B, the said rope being passed over a pulley, c, and down the side of the barn in the usual manner. Sustained at their upper ends by the main track A and at their lower ends by any suitable supports at the eaves of the barn are the lateral or side tracks, D, on which run forks or hooks E, provided with pulleys e, adapted to said tracks; or the said forks or hooks may be attached to blocks having wheels or pulleys fitted to run on the said tracks. To each of the said forks or hooks are attached two ropes, F and G, the ropes F being for the purpose of engaging the fork or hook with a mass of hay that has been elevated by the lifting-hooks, and the ropes G being so attached to the forks or hooks that the latter may be tilted thereby to disengage the same from the hay. In the form of my invention shown in Figs. 1 and 3 all of these ropes attached to the forks or hooks E run over suitable pulleys, and thence downward to be within reach of operators standing below; but in the arrangement shown in Fig. 2 the disengaging-ropes G' are attached at one end to fixed staples or other holders, g, so that when the loads carried by the hooks or forks E have moved a suitable distance from the main track A the said hooks or forks will be automatically tilted by the said ropes when they are drawn tight as the hooks or forks continue their descent on their inclined tracks away from the main track, as will be obvious from the said figure of the drawings.

The operation of my invention is as follows: When a mass of hay has been lifted and moved along on the main track A until it is opposite the side track, D, beneath which it is to be deposited, one of the ropes F is pulled by the operator to force one of the hooks E into the mass of hay. The elevating-rope C is then slackened; or the hay may be entirely disengaged from the elevating devices or hooks in any usual manner; and as the weight of the mass of hay is thus thrown onto the hook E the latter slides down its inclined track to carry the hay laterally to the desired position, when the operator will pull on the rope G to disengage the hooks from the hay, so that the latter may be deposited in the desired place in the hay-mow.

In the form of my invention shown in Fig. 2 the hay is disengaged from the hooks E as soon as the ropes G' are taut enough to tilt the hooks far enough for this purpose.

The side tracks, D, are preferably removably secured in place, so that when a sufficient quantity of hay has been deposited beneath them they may be removed to new positions. When these are thus removable, the main track A may be utilized as a support for their upper or inner ends, as herein shown; but if a series of these side tracks be used it is obvious that other supports for their inner ends must be provided, so that the carrier B may be free to run the entire length of the main track A.

While I have shown the side tracks, D, as being inclined, so that the hooks or forks E will run down the same by gravity, it will be understood that these tracks may be level, if desired, and the side carriers may be moved along the same by means now commonly employed to move the ordinary carriers on the tracks extending lengthwise of barns or hay-mows. I do not therefore wish to be understood as limiting my invention to the precise arrangement nor to the details herein shown and described, as many modifications may be made within the province of mechanical skill without departing from the spirit of my invention.

I claim and desire to secure by Letters Patent—

1. In a hay-carrying apparatus, the combination, with a main track extending lengthwise of the barn or hay-mow, of side tracks and carrying apparatus thereon for conveying the hay laterally from the said main track, substantially as set forth.

2. In a hay-carrying apparatus, the combination, with the main track, of side tracks extending transversely to the said main track, forks or hooks adapted to run on said side tracks, ropes for engaging the said forks or hooks with the hay lifted by the elevator, and ropes for disengaging the said forks or hooks from the hay, substantially as set forth.

In testimony whereof I affix my signature in presence of two witnesses.

IRA L. SHERMAN.

Witnesses:
GEO. HENDERSON,
D. M. KENYON.